Feb. 18, 1941. C. G. STORM Re. 21,722

PROPELLENT CHARGE HOLDER

Original Filed Oct. 24, 1938

Inventor
Christian C. Storm
By G. Kosenich & J. H. Church
Attorneys

Reissued Feb. 18, 1941 Re. 21,722

UNITED STATES PATENT OFFICE 21,722

PROPELLENT CHARGE HOLDER

Christian G. Storm, Arlington, Va.

Original No. 2,210,959, dated August 13, 1940, Serial No. 236,714, October 24, 1938. Application for reissue September 4, 1940, Serial No. 355,378

15 Claims. (Cl. 102—12)

(Granted under the act of March 3, 1883, as amended April 30, 1928; 370 O. G. 757)

The invention described herein may be manufactured and used by or for the Government for governmental purposes, without the payment to me of any royalty thereon.

This invention relates in general to a projectile which is chiefly adapted for use with muzzle-loading ordnance and more particularly it has reference to a holder for increment propellent charges.

In the mortar projectile disclosed in U. S. Patents 1,628,527; 1,883,758 and 2,070,946, it is proposed to provide a plurality of spaced, radial, stabilizing fins on the tail and to utilize the fins to carry propellent charges in capsule form, the capsule not contributing to the propelling force. The capsules are composed of a more or less inflexible and combustible material different from the propellent charge and in order to insure their retention between the fins they must be accurately dimensioned and the fins must be exactly spaced. Even when these requirements are met failure frequently occurs due to uncontrolled shrinkage of the material of the capsule. In addition it is extremely difficult to obtain a secure joint between the cover and the body of the capsule and the joint is readily broken when it becomes necessary to force or snap the capsule into position between the fins with the result that moisture may enter the capsule and the enclosed loose powder may escape.

It is customary to issue a round of mortar ammunition with a maximum propellent charge and then, at the time of loading, to remove a portion of the charge as occasion requires. In view of this practice, it is desirable that the separate charges be so arranged that they may be removed by an operator wearing gloves and under conditions of darkness.

With a view to eliminating the use of a container of non-explosive material and the storage and assembly disadvantages of the capsule charge while meeting requirements of production and service it is proposed in this invention to employ a flexible sheet propellent which may be inexpensively and conveniently assembled into various sized charges that will be retained in place by their inherent resiliency when placed between the fins and still be capable of easy removal.

The specific nature of the invention as well as other objects and advantages thereof will clearly appear from a description of a preferred embodiment as shown in the accompanying drawing, in which.

Figure 1:
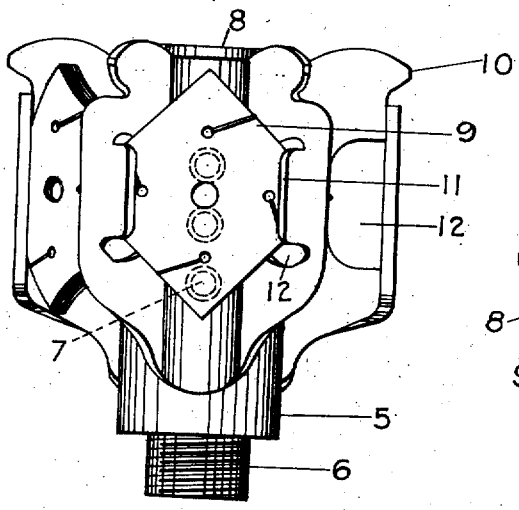
Fig. 1 is a view in side elevation of the tail of a projectile carrying propellent charges in the manner proposed by this invention.
Figure 2:
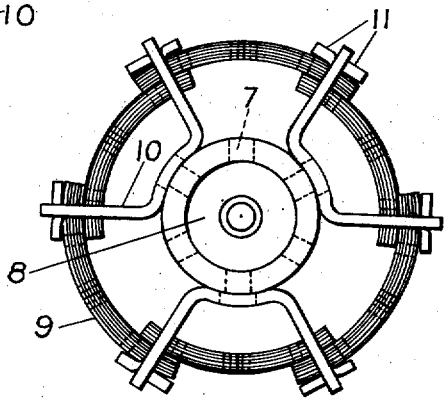
Fig. 2 is a view in end elevation.

Referring to the drawing by character of reference there is shown the tail of a mortar projectile comprising a central tube 5 having a threaded stem 6 for attachment to the body of the projectile (not shown) and having vents 7—7 in its walls for conducting the flame from a cartridge 8 to ignite the propellent charges 9—9 on the outside of the tube.

A plurality of longitudinal fins 10—10, circumferentially spaced and radially arranged, are formed on or secured to the outside of the tube 5. The fins which serve in a well known manner to stabilize the projectile in flight, are preferably formed at their outer edges with flanges 11 to increase rigidity and they also include apertures 12 to permit equalization of gas pressures on opposite faces of the fins and thereby avoid deformation of the fins.

Figure 3:
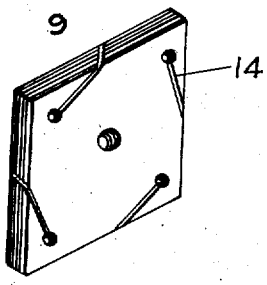
Figs. 3 and 4 are detail views of the charges.
Figure 4:
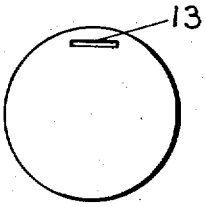
Figure 5:
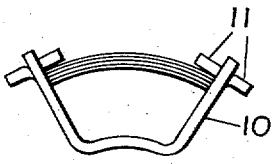
Fig. 5 is an end view showing a modified arrangement of holding a charge.

The propellent charge 9 consists of a plurality of flexible sheets of a propellent powder, the sheets being square, round or of any other shape adapted to cooperate with the vents 7 to provide ignition of the edges of the individual sheets of the charge and may be perforated for a similar purpose as shown in Figs. 1 and 3. The sheets are readily assembled to constitute a charge of any desired thickness and may be bound together in any convenient manner by clips 13 or cord 14 whereby the charge retains flexibility. The size of the sheets should be so determined that, when grouped into a charge, the charge can only be placed between the fins or made to engage behind the flange 11 or in the apertures 12 by flexing it. Considerable tolerance is thereby permitted in the size of the charge and in the spacing of the fins.

In order to additionally insure the retention of the charge it is preferably of a size exceeding the distance between the engaged portions of the fins so that, when in place between fins, it will remain flexed whereby advantage is taken of its inherent resiliency to exert pressure and maintain it in engagement with the fins, but it will be understood that the invention is not to be construed as limited to charges which are flexed when in position since charges which require flexing to be put in position but are loosely held when in position constitute operable forms of the invention within the scope of the novel combination hereinafter claimed. As illustrated in the drawing the charge will preferably be bent away from the tube to facilitate overlapping of adjacent charges in one aperture 12 and also to enable an operator to easily place a finger between the charge and the tube to effect removal of the charge. The charge may be readily inserted and as readily removed, even under adverse conditions. Charges that have been removed are not damaged and may be reinserted in other rounds when desired.

I claim:

1. A tail assembly for use with a projectile comprising in combination, a tail member having spaced elements, a resilient sheet propellent charge positioned between said elements in interengaging relation therewith and having its dimensions between said spaced element-engaging portions thereof greater than the distance between charge engaged portions of the elements thereby requiring deformation of the propellent charge in said position, and means for retaining the propellent charge in said deformed position.

2. A tail assembly for use with a projectile comprising in combination, a central tail member, a plurality of circumferentially spaced radially disposed fins secured to said central tail member, a resilient sheet propellent charge positioned between a pair of adjacent fins in interengaging relation therewith and having its dimensions between fin-engaging portions thereof greater than the distance between charge engaged portions of the fins thereby requiring deformation of the propellent charge in said position, and means forming a normal part of said fins for retaining the propellent charge in said deformed position whereby the use of auxiliary securing means for the propellent charge is eliminated through use of its inherent resiliency as a securing agent.

3. A tail assembly for use with a projectile comprising in combination, a central tail member, a plurality of circumferentially substantially equally spaced radially disposed fins secured to said central tail member, a resilient sheet propellent charge positioned between each pair of adjacent fins in interengaging relation therewith and each charge having its dimension between fin-engaging portions thereof greater than the distance between charge engaged portions of the fins thereby requiring deformation thereof in said position, and means for retaining the propellent charges between the fins in said deformed positions.

4. A tail assembly for use with a projectile comprising in combination, a plurality of radially disposed circumferentially spaced stabilizing fins, a resilient sheet propellent charge comprised of a plurality of bound flexible sheets positioned between a pair of adjacent fins in interengaging relation therewith and having its dimension between fin-engaging portions thereof greater than the distance between charge engaged portions of the fins thereby requiring deformation of the propellent charge in said position and means releasably retaining the propellent charge between the pair of adjacent fins in said deformed position.

5. A tail assembly for use with a projectile comprising in combination, a central tail member, a plurality of circumferentially spaced radially disposed perforated fins secured to said central tail member, and a resilient sheet propellent charge disposed between a pair of adjacent fins in interengaging relation therewith, said propellent charge having opposed portions on a line of its greatest dimension protruding through the perforations of the adjacent fins and having its dimensions between the fin-engaging portions thereof greater than the distance between charge engaged portions of the fins whereby the propellent charge will be deformed and stressed in said position thereby being retained in said position by the inherent resiliency of the charge.

6. The structure of claim 5 wherein a resilient propellent charge of the character recited is disposed between each pair of adjacent fins with alternate charges outermost and adjacent charges overlapping in engaging relation.

7. The structure of claim 5 wherein said propellent charge is comprised of a plurality of bound sheets forming a substantially rectangular charge and a diagonal of said charge is disposed to conform with said line of greatest dimension.

8. A tail assembly for use with a projectile comprising in combination, a central tail member, a plurality of circumferentially spaced radially disposed fins secured to the central tail member, said fins each being provided with opposed flanges adjacent their outer edges, and a resilient sheet propellent charge having opposed portions disposed in engaging relation with a pair of adjacent fins inwardly of the pair of adjacent flanges thereon in abutting relation therewith and having its dimension between said opposed engaging portions thereof sufficiently greater than the distance between charge engaged portions of the fins to deform the propellent charge in said position.

9. A tail assembly for use with a projectile comprising in combination, a central tail member, a plurality of circumferentially spaced radially disposed fins secured to the central tail member, said fins each being provided with opposed flanges adjacent their outer edges and with perforations inwardly extending from the flanges, and a resilient sheet propellent charge disposed between a pair of adjacent fins in interengaging relation therewith, said propellent charge having opposed portions on a line of its greatest dimension protruding through said perforations of the adjacent fins and abutting the flanges of said pair of fins, said resilient propellent charge having its dimensions between the portions thereof engaging the fins greater than the distance between charge engaged portions of the fins thereby deforming the propellent charge in said position.

10. The structure of claim 9 wherein a resilient propellent charge is disposed between each pair of adjacent fins with alternate charges outermost and disposed as recited and adjacent portions of adjacent charges overlapping in engaging relation.

11. In a projectile having tail fins, a flexible sheet propellent charge in interengagement with adjacent fins, said charge being so shaped and so dimensioned as to be positionable in said interengaging relation only by flexing of the charge.

12. In a projectile with tail fins having apertures therein, a flexible propellent charge protruding through the apertures in the fins and caged thereby, said charge being so shaped and so dimensioned as to be positionable in said caged relation and removable therefrom only by flexing of the charge.

13. In a projectile having tail fins, a propellent charged formed of a bundle of thin sheets fastened together and in interengaging relation with adjacent pairs of said fins, said sheets having their edge portions increased by means of perforations through the bundle.

14. In a projectile having tail fins with perforations therein, a naked, flexible sheet propellent charge of polygonal shape having corners thereof protruding through perforations of adjacent fins respectively, whereby said charge is held caged within said perforations and is removable only by flexing of said charge.

15. In a projectile having tail fins with perforations therein, a naked, flexible sheet propellent charge of circular shape having extremities of a diameter thereof protruding through perforations of adjacent fins respectively whereby said charge is held caged within said perforations and is removable only by flexing of said charge.

CHRISTIAN G. STORM.